Feb. 16, 1943.  E. R. HONEYWELL  2,311,393
POWER DRIVE FOR MOTOR VEHICLES
Filed March 25, 1942  2 Sheets-Sheet 1
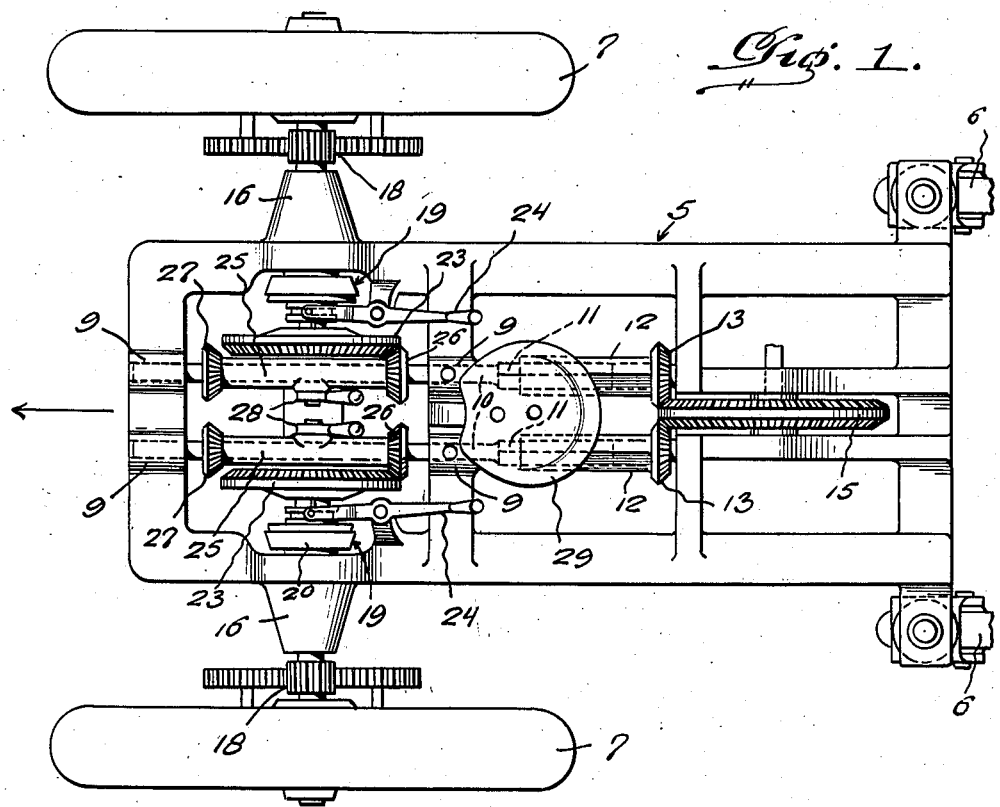
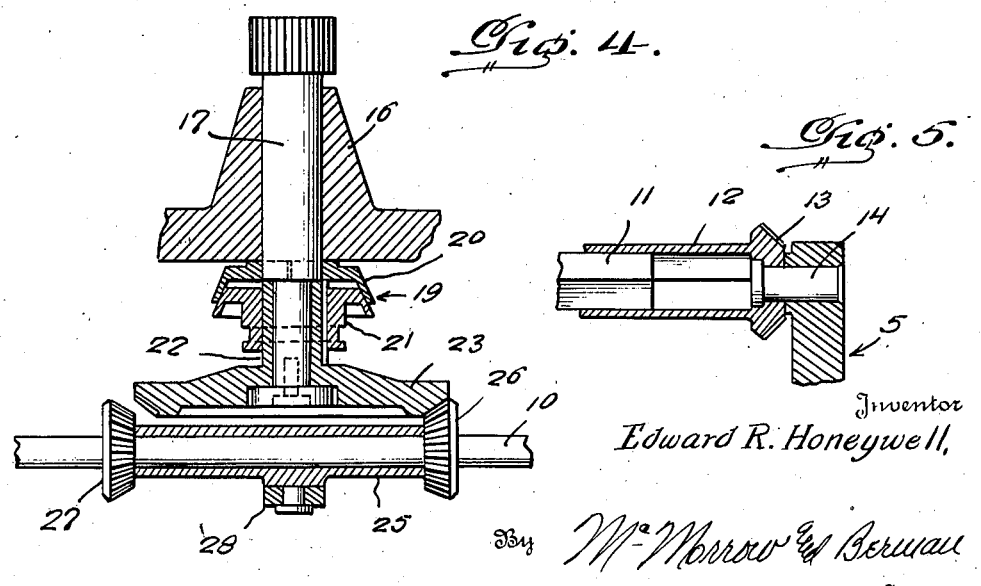
Inventor
Edward R. Honeywell,
By McMorrow & Berman
Attorneys Feb. 16, 1943.  E. R. HONEYWELL  2,311,393
POWER DRIVE FOR MOTOR VEHICLES
Filed March 25, 1942  2 Sheets-Sheet 2

Inventor
Edward R. Honeywell,

By McMorrow & Berman
Attorneys

Patented Feb. 16, 1943

2,311,393

UNITED STATES PATENT OFFICE 2,311,393

POWER DRIVE FOR MOTOR VEHICLES

Edward R. Honeywell, Salisbury, Md.

Application March 25, 1942, Serial No. 436,199

1 Claim. (Cl. 180—17)

This invention relates to power drives for motor vehicles, tractors and similar devices, and has for the primary object the provision of a drive mechanism for the traction wheels of a vehicle, whereby said vehicle may be steered to eliminate the use of a conventional steering device for the vehicle and will permit power to be delivered equally to the traction wheels for the rotation thereof in either direction or to deliver power to either of the traction wheels for rotation thereof in either direction, while the other traction wheel idles so that the vehicle may be made to turn in a small space and also to facilitate the extraction of the vehicle from a stalled position should either of the traction wheels lose traction from any cause.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which Figure 1 is a top plan view illustrating a portion of a motor vehicle, tractor or similar device equipped with a drive mechanism constructed in accordance with my invention.

Figure 4 is an enlarged fragmentary sectional view showing one of the drive axles and the clutch therefor.

Figure 5 is a fragmentary sectional view illustrating a portion of one of the drive shafts and the means of slidably securing one of the gears thereto.

Figure 2:
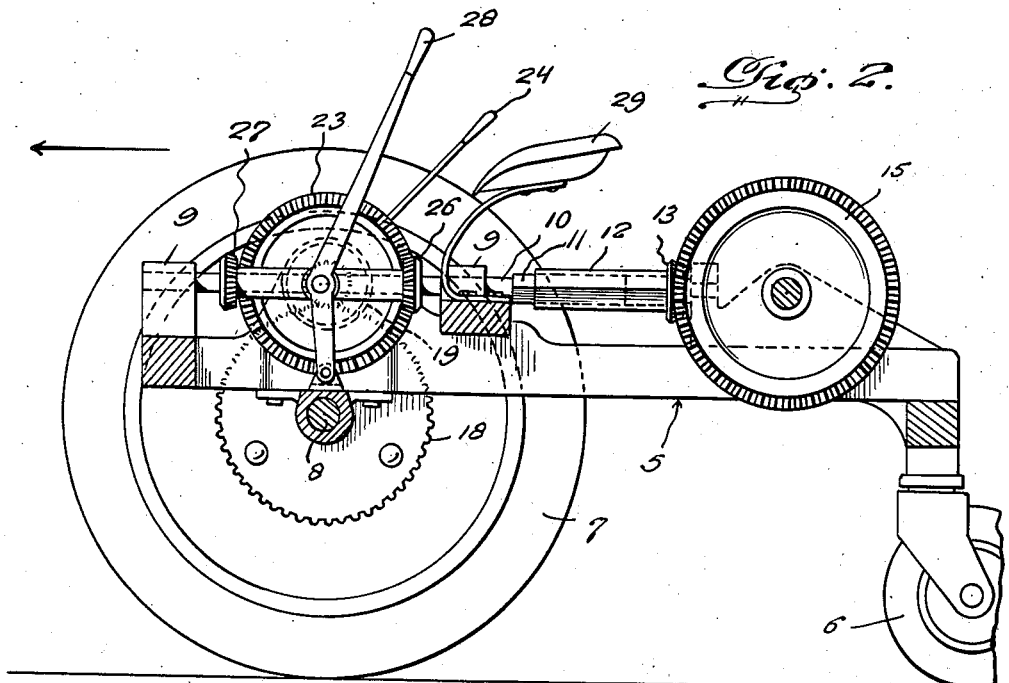
Figure 2 is a vertical sectional view illustrating the device.
Figure 3:
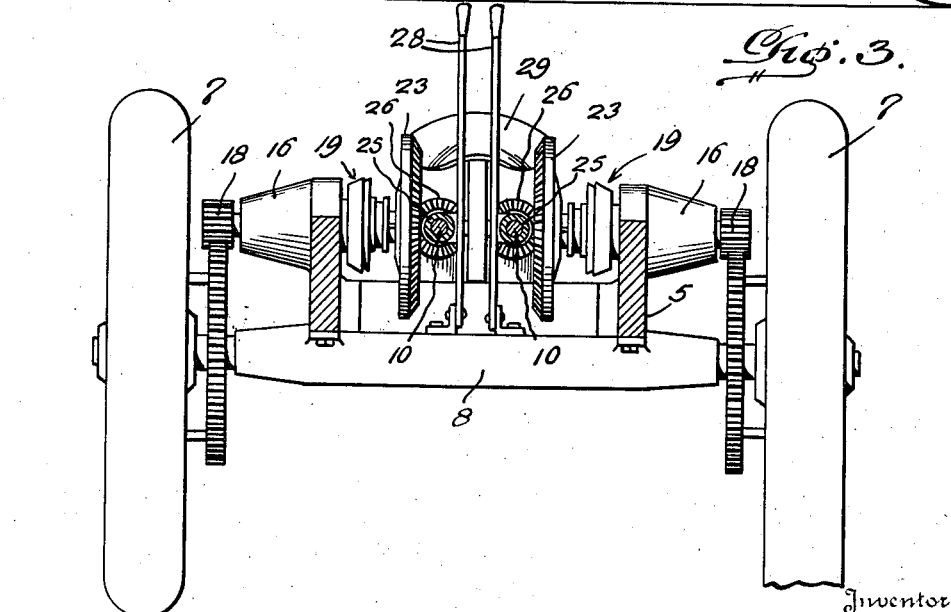
Figure 3 is a transverse sectional view illustrating the controls for driving the traction wheels simultaneously or independently of each other.

Referring in detail to the drawings, the numeral 5 indicates the frame of a motor vehicle, tractor or similar device. The rear end of the frame is supported by opposed pilot wheels 6 free to swing in either direction so that they will readily follow the direction of travel of opposed traction wheels 7 which support the forward end of the frame 5. The traction wheels 7 are journaled on an axle 8 secured to the frame and arranged transversely thereof adjacent the forward end of said frame.

The frame 5 is provided with aligned bearings 9 to rotatably and slidably support parallel drive shafts 10 each provided with angularly related faces 11 at one end thereof. Sleeves 12 are slidable on the faces 11 of the drive shaft 10 and the internal walls thereof are shaped to match the faces 11 whereby said shaft may slide relative to said sleeve and still maintain a driving connection therewith.

Beveled gears 13 are secured to the sleeves 12 and are journaled on headed pins 14 secured to the frame 5. The gears 13 mesh with a main drive gear 15 suitably journaled on the frame 5 and may be operatively connected in any well known manner to a power source (not shown) and mounted on the frame 5.

The frame 5 is provided with bearings 16 which rotatably support above the axle 8 axle shafts 17 geared to the traction wheels 7, as shown at 18. The axle shafts 17 are equipped with clutches 19 each including a clutch element 20 and a clutch element 21. The clutch elements 20 are secured on the axle shafts 17, while the clutch elements 21 are slidably keyed on sleeves 22 journaled on the axle shafts 17 and formed integrally with gears 23 arranged in opposed spaced relation with the drive shafts 10 extending therebetween.

The clutch elements 21 may be engaged and disengaged with the clutch elements 20 by pivotally mounted control levers 24.

Sleeves 25 are mounted on the drive shafts 10 for sliding movement therewith and said shafts have secured thereon a gear 26 and a gear 27 located at opposite ends of the sleeves. Control levers 28 are connected with the sleeves 25 for shifting the sleeves 25 to engage and disengage either the gears 26 or 27 with the gears 23. The gears 26 and 27 being associated with the gears 23, as shown in Figure 1, and engageable and disengageable therewith as above mentioned, will permit driving of the traction wheels 7 in either direction with an equal amount of power from the power source. The clutches 19 will permit driving of either of the traction wheels by the power source independently of the other and in either direction.

Thus it will be seen that the operator occupying the seat 29 on the vehicle may conveniently steer the vehicle in either direction by the drive mechanism heretofore described in detail, by operating said mechanism so that power will be delivered to one of the traction wheels while the other idles consequently permitting the vehicle to be turned within a comparatively small space and either to the right or left, the pilot wheels assisting the vehicle in making the short turn.

Should one or the other of the traction wheels lose traction from some cause, that traction wheel may be freed from the power source while power is delivered to the traction wheel having traction so that the vehicle will be made to readily extract itself from the stalled position.

A vehicle employing the drive mechanism as shown and described will have a maximum amount of draft power and when used for towing another device will be less apt to lose traction or to rear upwardly under a heavy load as would a vehicle equipped with a conventional type of drive means. Also it will be seen that by being able to steer the vehicle by the drive mechanism eliminates the employment on the vehicle of a conventional steering mechanism.

While I have shown and described the preferred embodiment of my invention, it will be understood that minor changes in construction, combination and arrangement of parts may be made without departing from the spirit and scope of the invention as claimed.

Having thus described the invention, what I claim is:

In a power drive for motor vehicles, a frame, a front axle secured to the frame adjacent the forward end of the latter, ground traction wheels journaled on said axle, pilot type wheels supporting the rear end of the frame, journals paralleling the front axle in a plane thereabove and carried by opposite sides of the frame and extending outwardly therefrom, shafts supported by the journals and geared to the traction wheels, opposed gears journaled on the shafts, clutches for connecting and disconnecting the gears to said shafts, parallel drive shafts extending between said gears and journaled on the frame and extending forwardly and rearwardly of the gears and longitudinally of the frame, each of said drive shafts including telescopic sections having a rotatable drive connection therebetween, one section of each drive shaft being slidable on the frame and relative to its companion section and the latter-named section being non-slidable on the frame, pairs of spaced gears secured to the drive shafts and alternateingly moved into and out of mesh with the first-mentioned gears, sleeves on the drive shafts and free thereof and abutting the pairs of gears, pivotally mounted hand levers pivoted to said sleeves for sliding the latter in opposite directions to bring about opposite sliding movements of the slidable sections of the drive shafts for the alternate engagement and disengagement of the pairs of gears with the first-mentioned gears, and means for delivering an equal amount of power to the non-slidable sections of the drive shaft.

EDWARD R. HONEYWELL.